US005449900A

United States Patent [19]

Halliwell

[11] Patent Number: 5,449,900

[45] Date of Patent: Sep. 12, 1995

[54] APPARATUS FOR DETECTING THE ANGULAR POSITION OF A SHAFT USING LASER LIGHT BACKSCATTERED FROM A SHAFT SURFACE

[75] Inventor: Neil A. Halliwell, Leicester, United Kingdom

[73] Assignee: University of Southampton, Hampshire, United Kingdom

[21] Appl. No.: 969,819

[22] PCT Filed: May 30, 1991

[86] PCT No.: PCT/GB91/00865

§ 371 Date: Jan. 19, 1993

§ 102(e) Date: Jan. 19, 1993

[87] PCT Pub. No.: WO91/19169

PCT Pub. Date: Dec. 12, 1991

[30] Foreign Application Priority Data

May 30, 1990 [GB] United Kingdom ................. 9012004

[51] Int. Cl.[6] ................ G01D 5/34

[52] U.S. Cl. ................ 250/231.13; 341/13; 250/231.16

[58] Field of Search ................ 250/231.13, 231.16; 341/13, 31; 356/375

[56] References Cited

U.S. PATENT DOCUMENTS

| | | | |
|---|---|---|---|
| 3,584,959 | 6/1971 | Del Carlo et al. | 250/231.13 |
| 3,935,447 | 1/1976 | Black et al. | 250/231.13 |
| 4,908,510 | 3/1990 | Huggins et al. | 250/231.13 |
| 5,006,703 | 4/1991 | Shikunami et al. | 341/13 |

FOREIGN PATENT DOCUMENTS

| | | | |
|---|---|---|---|
| 0145919 | 6/1990 | Japan | 250/231.16 |
| 2093991 | 9/1982 | United Kingdom . | |

OTHER PUBLICATIONS

Applied Optics, vol. 28, No. 20, Oct. 15, 1989, Yamaguchi et al, "Laser speckle rotary encoder", pp. 4401–4406.

Derwent Abstract of Patent No. SE,A,8 402 159, Oct. 19, 1985, Bijlenga et al, (1 page).

Derwent Abstract of Patent No. SU,A,1 506 359, Sep. 7, 1989, Kholin, (1 page).

Applied Optics, vol. 26, No. 19, Oct. 1, 1987, Ami et al, "Optical method of measuring angular displacement using a diffraction pattern", pp. 4310–4312.

Patent Abstracts of Japan, vol. 014, No. 422, Publication No. 02 165 007, Jun. 26, 1990, p. 1104.

*Primary Examiner*—Stephone B. Allen

*Attorney, Agent, or Firm*—Flynn, Thiel, Boutell & Tanis

[57] ABSTRACT

Two beams of laser light are directed onto the surface of a rotary shaft at points (12*a*, 12*b*) spaced longitudinally along the shaft from one another. Light backscattered by the optically rough surface of the shaft is detected by means of detectors (18*a*, 18*b*) which produce output signals related to the detected intensity. Signal-processing means (20*a*, 20*b*) associated with each beam include memory means for storing a reference waveform. The signal-processing means (20*a*, 20*b*) provide a signal indicative of the phase of the detected intensity relative to a reference waveform stored in the memory means. A comparator (22) compares the output signals from the signal-processing means (20*a*, 20*b*) to provide an indication of torque transmitted through the shaft (12). Alternatively, a single beam and detector may be used to give an indication of angular position of the shaft.

10 Claims, 1 Drawing Sheet

APPARATUS FOR DETECTING THE ANGULAR POSITION OF A SHAFT USING LASER LIGHT BACKSCATTERED FROM A SHAFT SURFACE

FIELD OF THE INVENTION

The present invention relates to a laser detector, for example, a torquemeter or device for measuring the torque transmitted through rotating shaft systems or a shaft encoder or device which provides an indication of angular position.

BACKGROUND OF THE INVENTION

In engineering installations power is frequently transmitted from a source, such as an internal combustion engine, a gas turbine or an electric motor, to a receiver, such as a compressor, dynamo, propellor or wheel, through a gearbox by means of torque applied to a rotating shaft. The transmission of torque is therefore of primary importance in the research and development of more efficient and reliable transmission systems. Design engineers are concerned to provide a steady transmission of torque through transmission systems so as to minimize gear wear, bearing and coupling failure, shaft fatigue failure and other associated torsional vibration and noise problems. Modern power transmission systems, furthermore, often involve the use of flexible couplings, the lifetimes of which are severely restricted if high levels of fluctuating torque are present.

To date, progress in these fields has been hindered by the lack of an instrument capable of providing immediate, accurate measurements of time-resolved torque through a driven system.

SUMMARY OF THE INVENTION

In accordance with a first aspect of the invention there is provided a laser detector comprising means for generating a beam of laser light and directing it onto the surface of a rotary shaft; detector means associated with the beam for detecting the intensity of light backscattered by the surface and providing an output signal related to the detected intensity; signal-processing means associated with the beam including memory means for storing a reference waveform, the signal-processing means being operable to provide an output signal indicative of the phase of the detected intensity output signal relative to the reference waveform; and, hence, an indication of the angular position of the shaft relative to a reference position.

In a further aspect the invention provides a laser torquemeter comprising at least two such laser detectors, the beams of laser light generated by the detectors being directed onto the surface of the rotary shaft at locations spaced longitudinally along the shaft from one another; the torquemeter further comprising comparator means for comparing the output signals from the signal-processing means of the respective detectors to provide an indication of torque transmitted through the shaft.

BRIEF DESCRIPTION OF THE DRAWINGS

A shaft encoder and one form of laser torquemeter in accordance with the invention will now be described in detail, by way of example, with reference to the drawings, in which.

DETAILED DESCRIPTION

Figure 1:
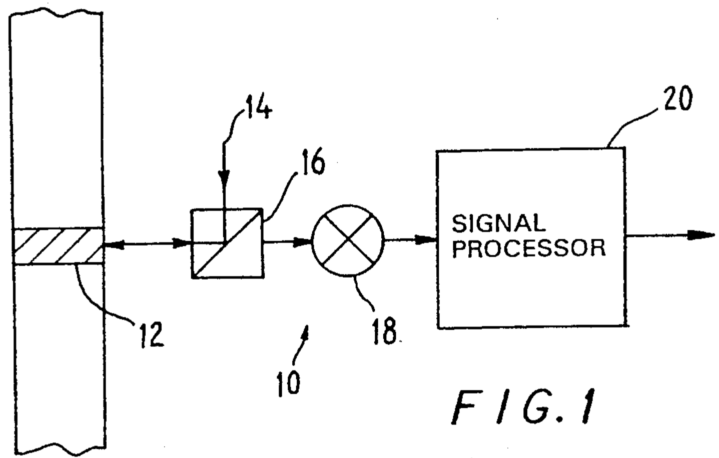
FIG. 1 shows a shaft encoder or angular position detector in accordance with the invention.

The shaft encoder 10 shown in FIG. 1 utilizes the formation of a 'speckle pattern' to measure the angular position of a rotating shaft 12.

A speckle pattern is formed when a laser beam is incident on an optically rough surface. Constructive and destructive interference of de-phased but still coherent component wavelets results in a chaotic distribution of high and low intensities in the backscattered light. This distribution is referred to as a speckle pattern. The amplitude of each speckle in the pattern may be considered to be constant across its extent and neighboring speckles will be uncorrelated.

When the rough surface moves, the speckles forming the pattern will tend to move with the surface until a sufficient change in the population of scatterers at the surface occurs and the speckles 'boil'. Thus, if the surface rotates, as in the case of the surface of the shaft 12, the speckle pattern observed in any plane will repeat exactly with each rotation as the illuminated population of scatterers at the surface repeats with each revolution.

If the speckle pattern is sampled using a suitable photodetector, a periodic signal instantaneously proportional to the integrated intensity on the active area of the photodetector is produced.

A single laser beam 14 is directed onto an optically rough surface on the rotary shaft 12. A signal representing the resulting speckle pattern output by photodetector 18 is compared with a stored signal representing a reference pattern generated previously during a single rotation of the shaft. The phase difference between the detected pattern and the stored pattern is determined by means of a signal processor 20 to provide an accurate indication of the relative angular position of the shaft 12. Combination of the stored pattern with a pulse signal of known shaft position permits evaluation of absolute angular position.

Evaluation of the time-resolved torque transmitted by the shaft requires measurement of twist of the shaft surface using two beams a known distance apart. Each periodic waveform is stored in digital form in suitable memory and under 'no load' conditions the stored and current signals are 'locked' together. Subsequently, as load is applied to the shaft 12, the phase of each current waveform relative to the stored waveform varies in proportion to the twist of the shaft. Comparison of the phase differences at the two monitoring positions on the shaft permits the torque transmitted to be calculated.

Most surfaces are sufficiently optically rough to produce the necessary speckle pattern for monitoring. However, a machined surface on a metallic part may not reflect light efficiently enough to permit monitoring using a safe low-powered laser. It may therefore be preferable to provide a more reflective area on the rotary body.

Figure 2:
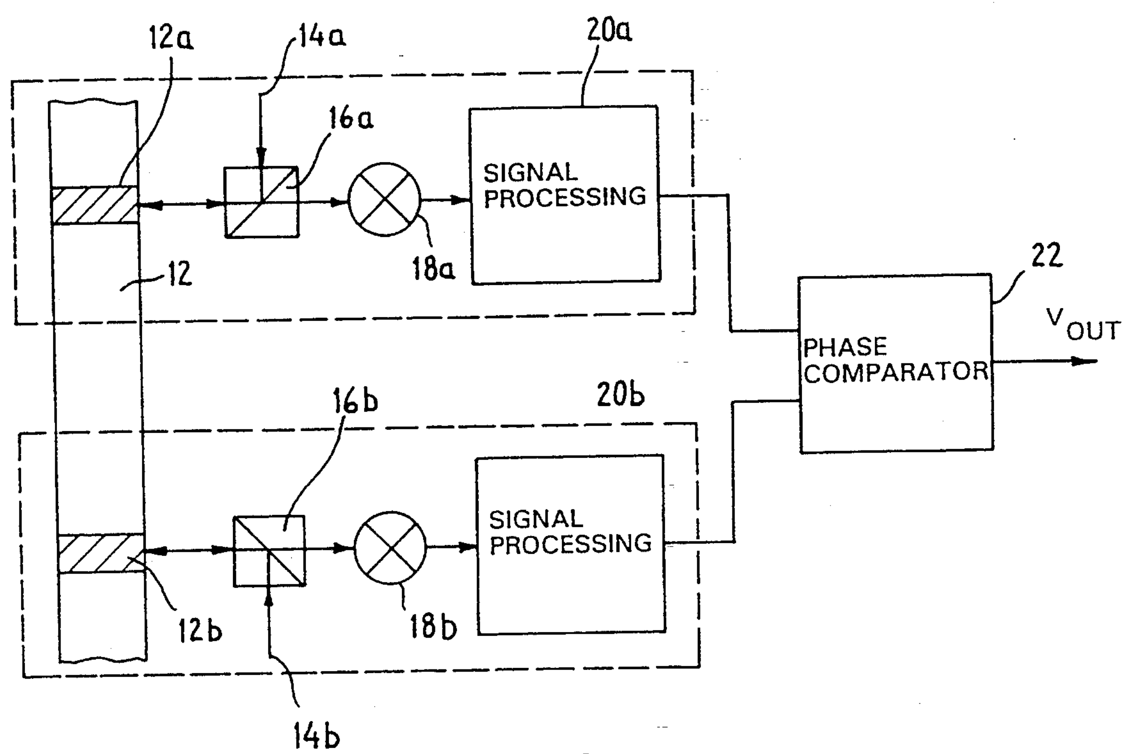
FIG. 2 is a schematic illustration of a torquemeter in accordance with the invention.

As shown in FIG. 2, suitably reflective optically rough surfaces may be formed by affixing reflective tape to the shaft 12 at locations **12*a* and 12*b*, a known distance apart. Laser beams from sources 14*a* and 14*b* are directed onto the shaft surface at 12*a* and 12*b* a known distance apart by means of beam splitters 16*a* and 16*b*. Light backscattered at the reflective tape at 12*a* and 12*b*, the speckle pattern, is detected by detectors 18*a* and 18*b*, the output signals from which are passed to signal processors 20*a* and 20*b*** respectively. In the case of many machined components, it is not essential to use reflective tape as their surfaces are sufficiently optically rough.

The signal processors 20*a* and 20*b* include memory means in which are stored the periodic intensity patterns generated as the shaft 12 rotates. The stored waveforms are used, as outlined above, for comparison with the signals generated by the photodetectors 18*a* and 18*b* to provide output signals indicative of the twist of the shaft 12 as a load is applied. These output signals are passed to a phase comparator 22 which, in turn, provides a signal proportional to the instantaneous torque being transmitted by the shaft 12.

The torquemeter described above is capable of providing immediate, time-resolved torque measurement whilst, at the same time, having the following advantages:

(i) the torquemeter uses a non-contact method of measurement and lengthy and expensive 'down-time' in fitting the apparatus to the shaft is thus avoided;

(ii) the apparatus is easy to use; the beams are simply directed at the surface of the shaft;

(iii) because a non-contact method is used, the apparatus is very versatile; it can be used on a wide range of shaft sizes, shapes and speeds;

(iv) the torquemeter can easily be made portable;

(v) the apparatus has no moving parts and is less prone to wear; consequently it has a long working lifetime;

(vi) it is economical to manufacture.

The speckle pattern provided by a rough surface on a rotating shaft can be used in the context of a shaft encoder which provides an indication of the angular position of a rotatable shaft.

The embodiments of the invention in which an exclusive property or privilege is claimed are defined as follows:

1. A laser detector for use with a rotating shaft, comprising: means for generating a beam of laser light and directing it onto a surface of the rotating shaft; and detector means for detecting an intensity of light backscattered by said surface and providing an intensity output signal related to the detected intensity; wherein said detector means includes signal-processing means having memory means for storing a reference waveform comprising an output signal from said detector means generated during one complete rotation of said rotating shaft and having means for providing a further output signal indicative of a phase of said intensity output signal relative to said reference waveform and, hence, an indication of an angular position of said shaft relative to a reference position in said reference waveform.

2. A laser detector according to claim 1 in which the surface of the shaft at a point of incidence of the laser beam is optically rough.

3. A laser detector according to claim 1, wherein said reference waveform is substantially identical to said intensity output signal during a 360° rotation of said shaft which starts from said reference position.

4. A method for detecting rotational movement of a rotating body, comprising the steps of: directing a beam of laser light onto a surface of the rotating body; and detecting an intensity of light backscattered at a point where the beam is incident on the surface; the method including prior to said directing step the step of storing a reference waveform comprising an output signal generated during one complete rotation of said rotating shaft, and including after said detecting step the step of generating a signal indicative of the phase of the detected intensity relative to said reference waveform and, hence, an indication of an angular position of the body relative to a reference position in said reference waveform.

5. A method according to claim 4, including prior to said storing step the step of generating said reference waveform by detecting an intensity of light backscattered from the surface when the body is rotating.

6. A laser torquemeter, comprising: first means for generating a first beam of laser light and directing it onto a first surface portion of a rotatable shaft; second means for generating a second beam of laser light and directing it onto a second surface portion of said shaft which is spaced longitudinally along said shaft from said first surface portion; first detector means for detecting an intensity of light backscattered by said first surface portion and for generating a first intensity output signal representative of the detected intensity of light backscattered by said first surface portion, said first detector means including first signal processing means having first memory means for storing a first reference waveform and having means for providing a first phase output signal indicative of a phase of said first intensity signal relative to said first reference waveform and thus indicative of an angular position of said first surface portion of said shaft relative to a first reference position; second detector means for detecting an intensity of light backscattered by said second surface portion and for generating a second intensity output signal representative of the detected intensity of light backscattered by said second surface portion, said second detector means including second signal processing means having second memory means for storing a second reference waveform and having means for providing a second phase output signal indicative of a phase of said second intensity signal relative to said second reference waveform and thus indicative of an angular position of said second surface portion of said shaft relative to a second reference position; and comparator means for comparing said first and second phase output signals to provide an indication of torque transmitted through said shaft.

7. A laser torquemeter according to claim 6, in which the first and second surface portions of said shaft are each optically rough.

8. A laser torquemeter according to claim 6, wherein said first reference waveform is substantially identical to said first intensity output signal during a 360° rotation of said shaft which starts from said first reference position, and said second reference waveform is substantially identical to said second intensity output signal during a 360° rotation of said shaft which starts from said second reference position.

9. A method for measuring torque transmitted by a rotatable body, comprising the steps of: directing a first beam of laser light onto a first surface portion of the body; directing a second beam of laser light onto a second surface portion of the body which is spaced axially along the body from the first surface portion; detecting a first intensity of light backscattered from a point where the first beam is incident on the first surface portion and generating a first phase signal which is indicative of the phase of the first intensity relative to a first reference waveform and thus is indicative of an angular position of the first surface portion of the shaft relative to a first reference position; detecting a second intensity of light backscattered from a point where the second beam is incident on the second surface portion and generating a second phase signal which is indicative of the phase of the second intensity relative to a second reference waveform and thus is indicative of an angular position of the second surface portion of the shaft relative to a second reference position; and comparing said first and second phase signals to provide an indication of torque transmitted through the body.

10. A method according to claim 9, including prior to said directing steps the steps of generating said first reference waveform by storing said first intensity during a 360° rotation of said shaft which starts from said first reference position, and generating said second reference waveform by storing said second intensity during a 360° rotation of said shaft which starts from said second reference position.

* * * * *